(12) United States Patent
Virtanen et al.

(10) Patent No.: US 8,400,087 B2
(45) Date of Patent: Mar. 19, 2013

(54) METHOD AND ARRANGEMENT FOR DETERMINING ROTATION SPEED OF A MOTOR

(75) Inventors: Reijo Virtanen, Vantaa (FI); Osmo Pasuri, Ojakkala (FI)

(73) Assignee: ABB Oy, Helsinki (FI)

( * ) Notice: Subject to any disclaimer, the term of this patent is extended or adjusted under 35 U.S.C. 154(b) by 794 days.

(21) Appl. No.: 12/548,061

(22) Filed: Aug. 26, 2009

(65) Prior Publication Data

US 2010/0052582 A1    Mar. 4, 2010

(30) Foreign Application Priority Data

Sep. 4, 2008   (FI) .................................. 20085826

(51) Int. Cl.
  *H02P 6/08* (2006.01)
(52) U.S. Cl. ......... 318/400.07; 318/400.01; 318/400.04; 318/605; 318/661; 318/778
(58) Field of Classification Search ............. 318/400.07, 318/400.04, 400.01, 605, 778, 809, 661
See application file for complete search history.

(56) References Cited

U.S. PATENT DOCUMENTS

| | | | |
|---|---|---|---|
| 4,044,285 A * | 8/1977 | Plunkett et al. | ............... 318/803 |
| 4,466,052 A | 8/1984 | Thrap | |
| 4,978,895 A | 12/1990 | Schwarz | |
| 5,646,499 A * | 7/1997 | Doyama et al. | ............... 318/801 |
| 5,754,026 A * | 5/1998 | Hampo et al. | ............... 318/802 |
| 5,898,287 A | 4/1999 | Roberti et al. | |
| 6,072,294 A | 6/2000 | Schmidt | |
| 7,049,778 B2 * | 5/2006 | Katanaya | ................. 318/400.04 |
| 2004/0052217 A1 | 3/2004 | Anghel et al. | |
| 2004/0061472 A1 | 4/2004 | Won et al. | |

FOREIGN PATENT DOCUMENTS

| | | |
|---|---|---|
| JP | 10-169570 A | 6/1998 |
| JP | 2004-222460 A | 8/2004 |

OTHER PUBLICATIONS

European Search Report issued in corresponding Application No. 09168774.9-2207 dated Jan. 29, 2010.
Finnish Search Report dated Feb. 13, 2009.

* cited by examiner

*Primary Examiner* — Walter Benson
*Assistant Examiner* — David Luo
(74) *Attorney, Agent, or Firm* — Buchanan Ingersoll & Rooney PC

(57) ABSTRACT

A method and an arrangement for determining the rotation speed of a motor fed by an inverter, the arrangement comprising means for determining the rotation speed of the motor in at least two alternative manners, whereby the means for determining the rotation speed of the motor comprise one of the at least two alternative manners of performance: means for measuring the frequency of the voltage fed to the motor by the inverter; and means for estimating the rotation speed of the motor on the basis of the measured frequency.

9 Claims, 2 Drawing Sheets

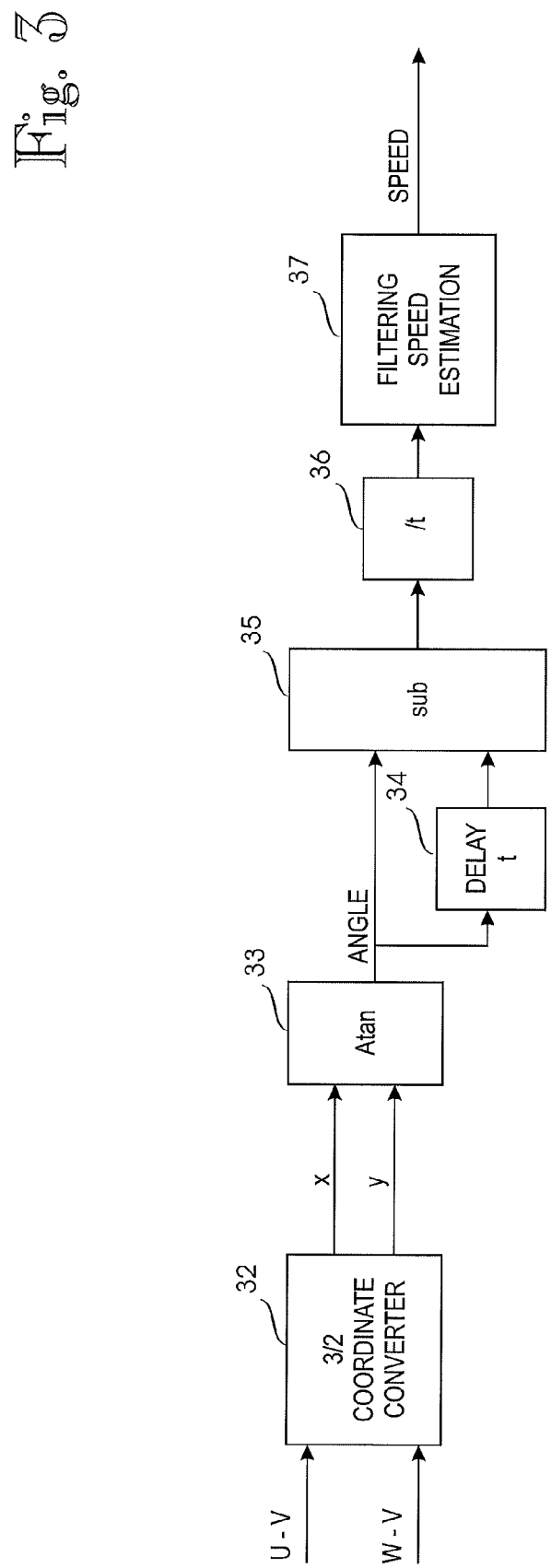

METHOD AND ARRANGEMENT FOR DETERMINING ROTATION SPEED OF A MOTOR

BACKGROUND OF THE INVENTION

The invention relates to a method and an arrangement for determining the rotation speed of a motor fed by an inverter.

An inverter is an electrical device which enables generation of voltage with changeable frequency. Typically, inverters are used in connection with motors for controlling them at a changing frequency. An inverter may also be a part of a frequency converter used for controlling a motor, for example.

In connection with inverters and, in general, motor drives comprising inverters, various safety functions are generally applied, the purpose of which is to monitor and ensure the safety of the motor drives in different operating situations and conditions. Examples of safety functions according to recommendations include Safe Torque Off STO, Safe Stop 1 SS1 and Safety Limited Speed SLS.

Implementing safety functions requires that the rotation speed of the motor be determined as reliably as possible. Typically, the rotation speed information on the motor is primarily obtained from the inverter controlling the motor. However, the rotation speed information obtained from the inverter alone does not necessarily guarantee the reliability of the safety functions, for example in a case where the inverter has failed in some way. Due to this, there is a need to arrange alternative redundant speed determination independent of the above-mentioned speed determination to implement the safety functions reliably.

One way to determine the rotation speed of the motor independently of the inverter feeding it is to measure the rotation speed from the motor by means of a tachometer, i.e. a rev counter. A tachometer may be connected to a motor, for example to its shaft, either with a physical connection or by means of an optical connection, for example, without physical contact, thus determining the rotation speed of the motor.

A problem relating to the determination of the rotation speed of a motor is that implementing the safety functions always requires an additional tachometer for each motor to be monitored, which increases the costs. Further, connecting an additional tachometer to the motor and/or positioning it in connection with a motor, as well as maintenance possibly required for the tachometer positioned in connection with the motor may be difficult in some conditions.

BRIEF DESCRIPTION OF THE INVENTION

An object of this invention is to provide a method and an apparatus implementing the method which avoid the above drawbacks or at least alleviate them. This object is achieved with a method, an arrangement, an inverter and a frequency converter which are characterized by what is stated in independent claims 1, 5, 9 and 10. Preferred embodiments of the invention are described in the dependent claims.

The invention is based on the idea of measuring, as an alternative determination manner of the rotation speed of a motor, the frequency of the voltage fed to the motor by an inverter and estimating the rotation speed of the motor on the basis of the frequency measured.

An advantage of the solution according to the invention is that the alternative determination of the rotation speed of a motor does not require an additional tachometer but the speed may be estimated with sufficient accuracy by means of a simple and inexpensive arrangement. Furthermore, the solution according to the invention does not require modelling of the motor, whereby the size of the motor, for instance, does not affect the functioning of the solution.

BRIEF DESCRIPTION OF THE FIGURES

The invention will now be explained in greater detail in connection with preferred embodiments, referring to the attached drawings, of which:

FIG. 3 shows a block diagram of an arrangement for estimating the rotation speed of a motor on the basis of phase to phase voltages in accordance with an embodiment.

DETAILED DESCRIPTION OF THE INVENTION

Figure 1:
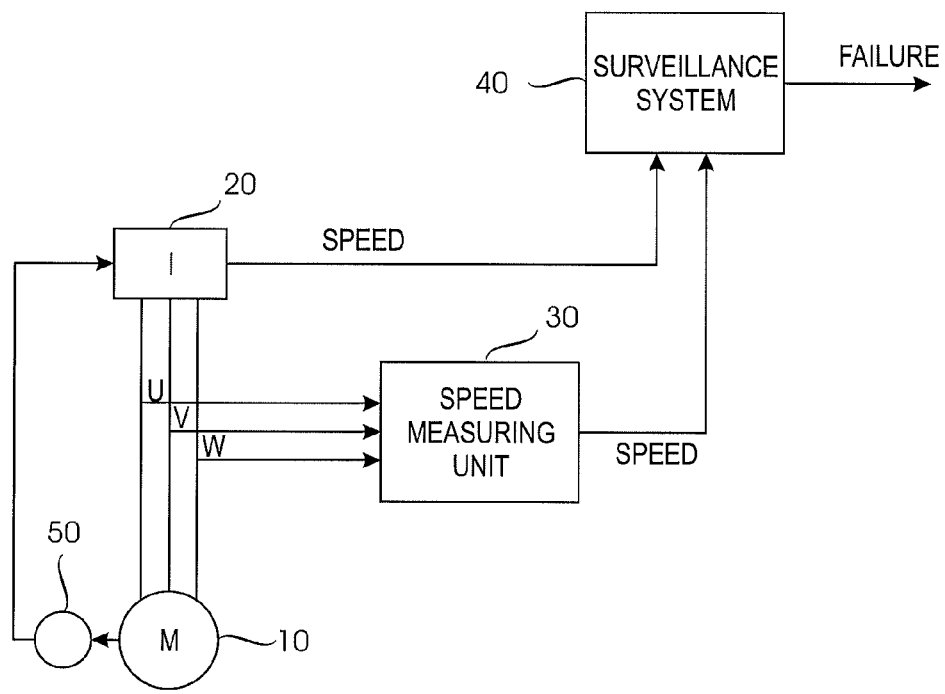
FIG. 1 shows a block diagram of a system to which the invention may be applied.

FIG. 1 shows a block diagram of a system to which the invention may be applied. The arrangement is shown in connection with an inverter 20 and a motor 10 fed by the inverter. It is to be noted that the use of the invention is not restricted to any particular type of inverter. Therefore, the structure of the inverter is not described in more detail in the following. For example, the supply (not shown in the figure) of the inverter 20, the motor 10 controlled by it or the type of connections between them, such as the voltage level or the number of phases, does not bear significance to the basic idea of the invention either. The motor 10 may be, for example, an asynchronous motor, such as an induction motor, or a synchronous motor, such as a permanent magnet motor, or a reluctance motor, such as a synchronous reluctance motor.

In the exemplary system of FIG. 1, the inverter 20 feeds the motor 10 via a three-phase supply, the phase voltages of which are denoted by U, V and W. The inverter 20 may be a part of a frequency converter (not shown). The figure further shows a surveillance system 40, which obtains the rotation speed information on the motor primarily from the inverter 20, for example. The rotation speed information may be generated in the inverter 20, which feeds the motor 10 and thus typically knows the rotation speed of the motor 10. It is also feasible to use a tachometer 50, for example, which measures and transmits the rotation speed information on the motor 10 to the inverter 20, from which the information is further transmitted to the surveillance system 40. The speed rotation information of the motor 10 could also be transmitted directly from a possible tachometer 50 to the surveillance system 40. The surveillance system 40 may be a separate system, as in the figure, or it may be integrated in the inverter 20, for example, or a part of a frequency converter. This has no relevance to the basic idea of the invention, however. The purpose of the surveillance system 40 is generally to monitor and guarantee the safety of the motor drive 10, 20 in various situations and conditions of use and to give, in a case of failure, for example, a failure signal indicating the failure or to perform other measures, for example switching measures. For this purpose, the surveillance system 40 uses for instance rotation speed information on the motor 10, which it preferably obtains from at least two alternative sources. The safety functions enabled by the surveillance system 40 are system-specific and will thus not be explained in detail in this context. Further, the invention is not restricted to any particular type of system but an object of the invention is to provide one alternative manner of determining the rotation speed of the motor 10 in a situation where it is desirable to determine the rotation speed of the motor in at least two alternative ways.

In accordance with the invention, the rotation speed of the motor is determined in a second alternative manner in such a way that preferably the frequency of the voltage fed to the motor 10 by the inverter 20 is measured and the rotation speed of the motor 10 is estimated on the basis of the frequency measured in this way. FIG. 1 shows a special speed measuring unit 30, by means of which the measurement and the estimation of the rotation speed can be carried out in accordance with one embodiment. The alternative, i.e. redundant, rotation speed information on the motor 10 can then be transmitted to the surveillance system 40, for instance, as shown in the figure. The speed measuring unit 30 or functionality corresponding to it may be a separate unit, as in the figure, or it may be integrated in the inverter 20, for example, or a part of a frequency converter. The following describes, by way of example, how the frequency of the voltage fed to the motor 10 by the inverter 20 can be measured and the speed rotation of the motor 10 be estimated in accordance with some embodiments. Units 31 to 37, described in the following example, are preferably included in the speed measuring unit 30. It is to be noted, however, that the invention is by no means restricted to the examples described in the following. It will be obvious to a person skilled in the art that the basic idea of the invention may also be implemented in alternative ways.

Figure 2:
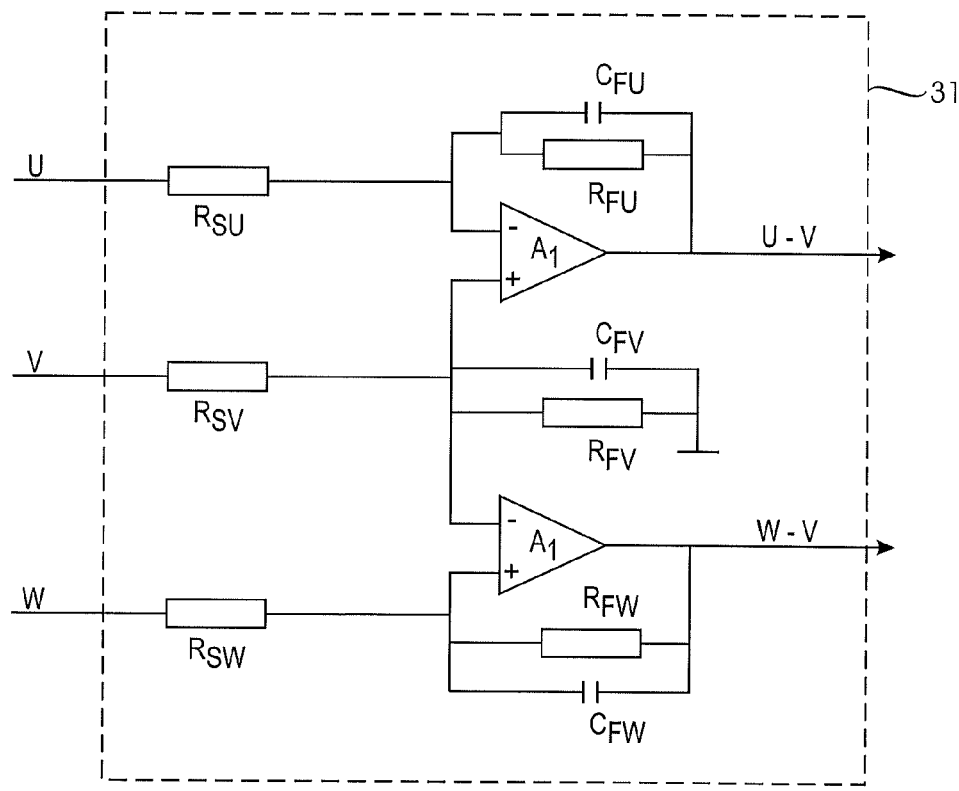
FIG. 2 shows a connection diagram of a measuring arrangement of phase to phase voltages in accordance with an embodiment.

FIG. 2 shows a connection diagram of a measuring arrangement 31 of phase to phase voltages in accordance with an embodiment. In accordance with the example of the figure, phase voltages U, V and W of the feed connection between the inverter 20 and the motor 10 are measured preferably by means of high-resistance measuring resistors $R_{SU}$, $R_{SV}$ and $R_{SW}$. Phase to phase voltages U-V and W-V are further generated from the phase voltages U, V and W by means of amplification units $A_1$ and $A_2$ and, at the same time, the voltages are low-pass filtered by means of low-pass filters preferably formed of filter resistors $R_{FU}$, $R_{FV}$ and $R_{FW}$ as well as of filter capacitors $C_{FU}$, $C_{FV}$ and $C_{FW}$. The values of the filter resistors $R_{FU}$, $R_{FV}$ and $R_{FW}$ and filter capacitors $C_{FU}$, $C_{FV}$ and $C_{FW}$ are preferably measured in such a way that the cut-off frequency of the low-pass filtering is so low (e.g. about 200 Hz) that pulse modulation is filtered off from the output voltage of the inverter. The frequency of the pulse modulation of the inverter is typically about 1 to 10 kHz. Instead of one of the phase to phase voltages U-V and W-V, the phase to phase voltage between phases U and W could as well be measured and used. Instead of low-pass filters included in measurement configuration 31 in FIG. 2, what are called integrators could also be used. However, this is not relevant to the basic idea of the invention.

FIG. 3 shows a block diagram of an arrangement for determining the frequency of the voltage fed to the motor 10 by the inverter 20 and further for estimating the rotation speed of the motor 10 on the basis of the phase to phase voltages in accordance with an embodiment. The two phase to phase voltages, for instance U-V and W-V, obtained from the measuring arrangement 31, are first taken to a 3/2 coordinate converter 32, by means of which the phase to phase voltage signals are converted to x/y coordinates. From the signals obtained in this way, the inverse function of the tangent, i.e. atan, is calculated by means of a unit 33, whereby the result is the angle of the output voltage of the frequency converter 20. The angular value is further transmitted to a subtraction member 35 both directly and via a delay member 34. The delay member 34 delays the signal by a time period t. The subtraction member 35 subtracts the angular value and the delayed angular value from each other. The difference obtained in this way being divided by the time period t gives the rate of change of the output voltage angle of the frequency converter 20. The rate of change of the output voltage angle obtained in this way is preferably filtered in a unit 37, and the frequency of the output voltage of the frequency converter 20, i.e. the frequency of the voltage feeding the motor 10, corresponding to the angular speed, is determined and the rotation speed of the motor 10 is estimated. The rotation speed of the motor 10 can be estimated in a manner known as such on the basis of the frequency of the voltage feeding the motor 10, depending on the motor type. For example, the rotation speed of a synchronous motor (synchronous speed) n (revolutions per minute) may be calculated with equation n=f/p, where f is the frequency of the feeding voltage and p is the number of pairs of poles of the motor. The rotation speed of an induction motor, for example, may also be estimated with this equation, although the rotation speed of the induction motor is further affected by slip Δn. In several applications, however, the effect of the slip can be ignored and a sufficiently accurate speed estimate can still be obtained. The alternative estimate of the rotation speed of the motor 10 thus obtained is further transmitted from the speed measuring unit 30 to the surveillance system 40 or other required use.

The speed measuring unit 30 or other possible equipment with which the rotation speed of the motor 10 or its estimate is determined may be implemented by means of one or more units. The term "unit" refers generally to a physical or logical entity, such as a physical device, a part of it or a software routine. The units may be physically separate or implemented as one entity. The equipment according to the embodiments of the invention may be implemented at least partly by means of a computer or corresponding signal processing equipment having suitable software. Such a computer or signal processing equipment preferably comprises at least a memory which provides a storage area made use of by arithmetic operations, and a processor, such as a general-purpose digital signal processor (DSP), performing the arithmetic operations. It is also feasible to use specific integrated circuits, such as ASIC (Application Specific Integrated Circuit) or other components and devices for implementing the functionality of the invention in accordance with different embodiments. Preferably, the measuring arrangement 31 is implemented by means of physical discrete components or the like, as shown in FIG. 2, for example. However, the low-pass filter functionality of the measuring arrangement 31, for example, or integrator functionality possibly used instead could be implemented by means of a computer or the like signal processing equipment and suitable software. The arrangement of FIG. 3 for estimating the rotation speed of the motor 10 on the basis of the phase to phase voltages, comprising units 32 to 37, or an arrangement with corresponding functionality is preferably implemented by means of a computer or the like signal processing equipment provided with suitable software, but an implementation using discrete components at least partly is also feasible.

The invention may be implemented in existing systems, such as in inverters and/or surveillance systems of motor drives, or discrete elements and devices may be used in a centralized or decentralized manner. Existing devices, such as inverters, typically comprise a processor and a memory which may be utilized in implementing the functionality of the embodiments of the invention. Thus, the changes and assemblies required by the implementation of the embodiments of the invention may, at least partly, be taken care of by software routines, which, in turn, may be implemented as added or updated software routines. If the functionality of the invention is implemented by means of software, such software may be provided as a computer program product comprising a computer program code the execution of which in the computer causes the computer or the like equipment to perform the functionality according to the invention in accordance with the above-described embodiments. Such a computer code may be stored on a computer-readable medium, such as an appropriate memory means, for instance flash memory or disk memory, from where it is readable to a unit or units that execute the program code. Further, such a program code may be loaded to a unit or units executing the program code via a suitable data network, or it may replace or update a possibly existing program code.

It will be obvious to a person skilled in the art that the basic idea of the invention may be implemented in a plurality of ways. The invention and its embodiments are thus not restricted to the examples described but may vary within the scope of the claims.

The invention claimed is:

1. A method for determining the rotation speed of a motor fed by an inverter, wherein a feed connection between the inverter and the motor has three phases, the method comprising:
    determining the rotation speed of the motor in at least two alternative manners, wherein one of the at least two alternative manners comprises:
    measuring the frequency of a voltage fed to the motor by an inverter; and
    estimating the rotation speed of the motor on the basis of the measured frequency,
    wherein the measurement of the frequency of the voltage fed to the motor by the inverter comprises:
        measuring two phase to phase voltages of the feed connection between the inverter and the motor;
        determining, on the basis of the measured phase to phase voltages, the rate of change of the angle of the voltage fed to the motor by the inverter; and
        determining the frequency corresponding to the rate of change of the angle.

2. The method of claim 1, comprising,
    low-pass filtering the measured two phase to phase voltages of the feed connection between the inverter and the motor to remove the modulation frequency, whereby the rate of change of the angle of the voltage fed to the motor by the inverter is determined on the basis of the low-pass filtered phase to phase voltages.

3. The method of claim 1, wherein the motor is an induction motor or a synchronous motor.

4. An arrangement for determining the rotation speed of a motor fed by an inverter, wherein a feed connection between the inverter and the motor has three phases, the arrangement comprising:
    means for determining the rotation speed of the motor in at least two alternative manners, wherein the means for determining the rotation speed of the motor comprise for performing one of the at least two alternative manners:
    means for measuring the frequency of the voltage fed to the motor by the inverter; and
    means for estimating the rotation speed of the motor on the basis of the measured frequency,
    wherein the means for measuring the frequency of the voltage fed to the motor by the inverter comprise:
        means for measuring two phase to phase voltages of the feed connection between the inverter and the motor;
        means for determining the rate of change of the angle of the voltage fed to the motor by the inverter on the basis of the measured phase to phase voltages; and
        means for determining the frequency corresponding to the rate of change of the angle.

5. The arrangement of claim 4, wherein the means for measuring two phase to phase voltages of the feed connection between the inverter and the motor comprise means for low-pass filtering the measured two phase to phase voltages of the feed connection between the inverter and the motor.

6. The arrangement of claim 4, wherein the motor is an induction motor or a synchronous motor.

7. A device for determining the rotation speed of a motor fed by an inverter, wherein a feed connection between the inverter and the motor has three phases, the device being configured to:
    determine the rotation speed of the motor in at least two alternative manners, wherein the device is, in order to perform one of the at least two alternative manners, configured to:
    determine the frequency of the voltage fed to the motor by the inverter; and
    estimate the rotation speed of the motor on the basis of the determined frequency, wherein the device is configured to determine the frequency of the voltage fed to the motor by the inverter by:
        measuring two phase to phase voltages of the feed connection between the inverter and the motor;
        determining, on the basis of the measured phase to phase voltages, the rate of change of the angle of the voltage fed to the motor by the inverter; and
        determining the frequency corresponding to the rate of change of the angle.

8. An inverter, the inverter being configured to:
    determine the rotation speed of a motor fed by the inverter in at least two alternative manners, wherein the inverter is, in order to perform one of the at least two alternative manners, configured to:
    measure the frequency of the voltage fed to the motor by the inverter; and
    estimate the rotation speed of the motor on the basis of the measured frequency, wherein the inverter is configured to measure the frequency of the voltage fed to the motor by the inverter by:
        measuring two phase to phase voltages of a feed connection between the inverter and the motor;
        determining, on the basis of the measured phase to phase voltages, the rate of change of the angle of the voltage fed to the motor by the inverter; and
        determining the frequency corresponding to the rate of change of the angle.

9. A frequency converter, the frequency converter being configured to:
    determine the rotation speed of a motor fed by the frequency converter in at least two alternative manners, wherein the frequency converter is, in order to perform one of the at least two alternative manners, configured to:
    measure the frequency of the voltage fed to the motor by the frequency converter; and
    estimate the rotation speed of the motor on the basis of the measured frequency, wherein the frequency converter is configured to measure the frequency of the voltage fed to the motor by the frequency converter by:
        measuring two phase to phase voltages of a feed connection between the frequency converter and the motor;
        determining, on the basis of the measured phase to phase voltages, the rate of change of the angle of the voltage fed to the motor by the frequency converter; and
        determining the frequency corresponding to the rate of change of the angle.

* * * * *